United States Patent
Pahrisch et al.

(10) Patent No.: US 6,918,479 B2
(45) Date of Patent: Jul. 19, 2005

(54) DIAPHRAGM SPRING FOR A FRICTION CLUTCH

(75) Inventors: Martin Pahrisch, Hallstadt (DE); Ronald Beck, Thundorf-Rothhausen (DE); Alfred Schraut, Waigolshausen (DE); Erwin Ziegler, Gressthal (DE); Frank Hirschmann, Niederwerm (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/638,604

(22) Filed: Aug. 11, 2003

(65) Prior Publication Data

US 2004/0069589 A1 Apr. 15, 2004

(30) Foreign Application Priority Data

Aug. 10, 2002 (DE) .......................... 102 36 808
Oct. 26, 2002 (DE) .......................... 102 49 979

(51) Int. Cl.⁷ .............................. F16D 13/71; F16F 1/34
(52) U.S. Cl. ...................................... 192/89.25; 267/161
(58) Field of Search .......................... 192/89.22, 89.23, 192/89.24, 89.25; 267/161

(56) References Cited

U.S. PATENT DOCUMENTS

| 3,235,049 A | * | 2/1966 | Hufstader ................. 192/89.23 |
| 3,977,504 A | * | 8/1976 | Kajitani ................... 192/89.25 |
| 4,465,267 A | * | 8/1984 | Chatelin ...................... 267/161 |
| 4,650,050 A | * | 3/1987 | Alas et al. ............... 192/70.12 |
| 5,078,247 A | * | 1/1992 | Meyer ...................... 192/70.27 |
| 5,579,881 A | * | 12/1996 | Weidinger ............... 192/70.25 |

FOREIGN PATENT DOCUMENTS

JP        58000632 A   *   1/1983   ........... F16D/13/44

* cited by examiner

Primary Examiner—Richard M. Lorence
(74) Attorney, Agent, or Firm—Cohen, Pontani, Lieberman & Pavane

(57) ABSTRACT

A diaphragm spring for a friction clutch includes a ring-like body area and a plurality of spring tongues arranged at the inner edge in a row in a circumferential direction and extending radially inward from the body area. Openings are formed between adjacent spring tongues, each opening having a radially outer base area, at least one of the openings being limited in the circumferential direction by a wall area having a curvature which increases as the wall proceeds from the base area.

10 Claims, 2 Drawing Sheets

DIAPHRAGM SPRING FOR A FRICTION CLUTCH

BACKGROUND OF THE INVENTION

1. Field of the Invention

The present invention relates to a diaphragm spring for a friction clutch, comprising a ring-like body area and a plurality of radially inward-extending spring tongues, arranged in a row in the circumferential direction, where openings which terminate in a radially outer base area are formed between adjacent spring tongues.

2. Description of the Related Art

These types of diaphragm springs are used in friction clutches to provide the pretensioning forces required in the engaged state of the clutch by supporting themselves against a housing on one side and against a pressure plate on the other. A clutch-release mechanism can act in the area of the radially inward-extending spring tongues, so that these tongues can serve essentially as actuating levers.

It is known that the openings which separate the individual spring tongues in the circumferential direction can be designed in their radially outer area, that is, in the area near the base, with, for example, a circular terminal contour or with a straight base, that is, a base which is approximately tangential and which is adjoined by circular sections.

A problem with these types of diaphragm springs is that, as a result of the geometry of the usually slightly umbrella-shaped, that is, conically designed, diaphragm spring, stresses which limit the maximum elastic force and thus also the maximum clutch-engaging force occur in the radially inner part of the ring-like body area.

SUMMARY OF THE INVENTION

The object of the present invention is to provide a diaphragm spring for a friction clutch which has a shape which is optimized with respect to stress.

According to the present invention, this object is accomplished by a diaphragm spring for a friction clutch, comprising a ring-like body area and a plurality of radially inward-extending spring tongues, arranged in a row in the circumferential direction, where openings are formed between adjacent spring tongues. The openings terminate in a radially outer base area, and at least one opening is limited in at least one circumferential direction by a wall area, the curvature of which increases as it proceeds radially inward from the base area.

As a result of the design according to the invention with a curvature which increases in the direction leading away from the base area, that is, away from the radially outermost area of the openings, the diaphragm spring is optimized with respect to stress at the radially inner end of the ring-like body area.

To avoid the occurrence of local stress peaks, the curvature increases continuously. The only transitions which are present are therefore continuous ones, that is, continuously differentiable ones, which means that, because of the elimination of corners or sharp-edged transitions, a uniform stress distribution can be achieved.

In one embodiment, the increasing curvature is formed at least in certain areas by a plurality of successive areas with essentially constant curvature. In this embodiment, therefore, several sections in the form of segments of a circle with essentially constant curvature are provided, where the curvature of successive areas increases in the direction leading away from the base area, which is to say that the radius of curvature decreases in the direction leading away from the base area.

In an embodiment which is especially advantageous with respect to stress, the wall area has the minimum amount of curvature at the circumferential center of the base area.

It can also be provided in the diaphragm spring designed in accordance with the invention that a wall area with essentially constant curvature and/or an essentially uncurved wall area can adjoin the wall area with increasing curvature.

To arrive at the most symmetric possible design of the diaphragm spring according to the invention, the minimum of one opening can be designed to have essentially bilateral symmetry with respect to a radial line intersecting the circumferential center of the base area. It is also possible for essentially all of the openings to be designed with approximately the same shape.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS FIGURES

DETAILED DESCRIPTION OF THE PRESENTLY PREFERRED EMBODIMENTS

Figure 1:
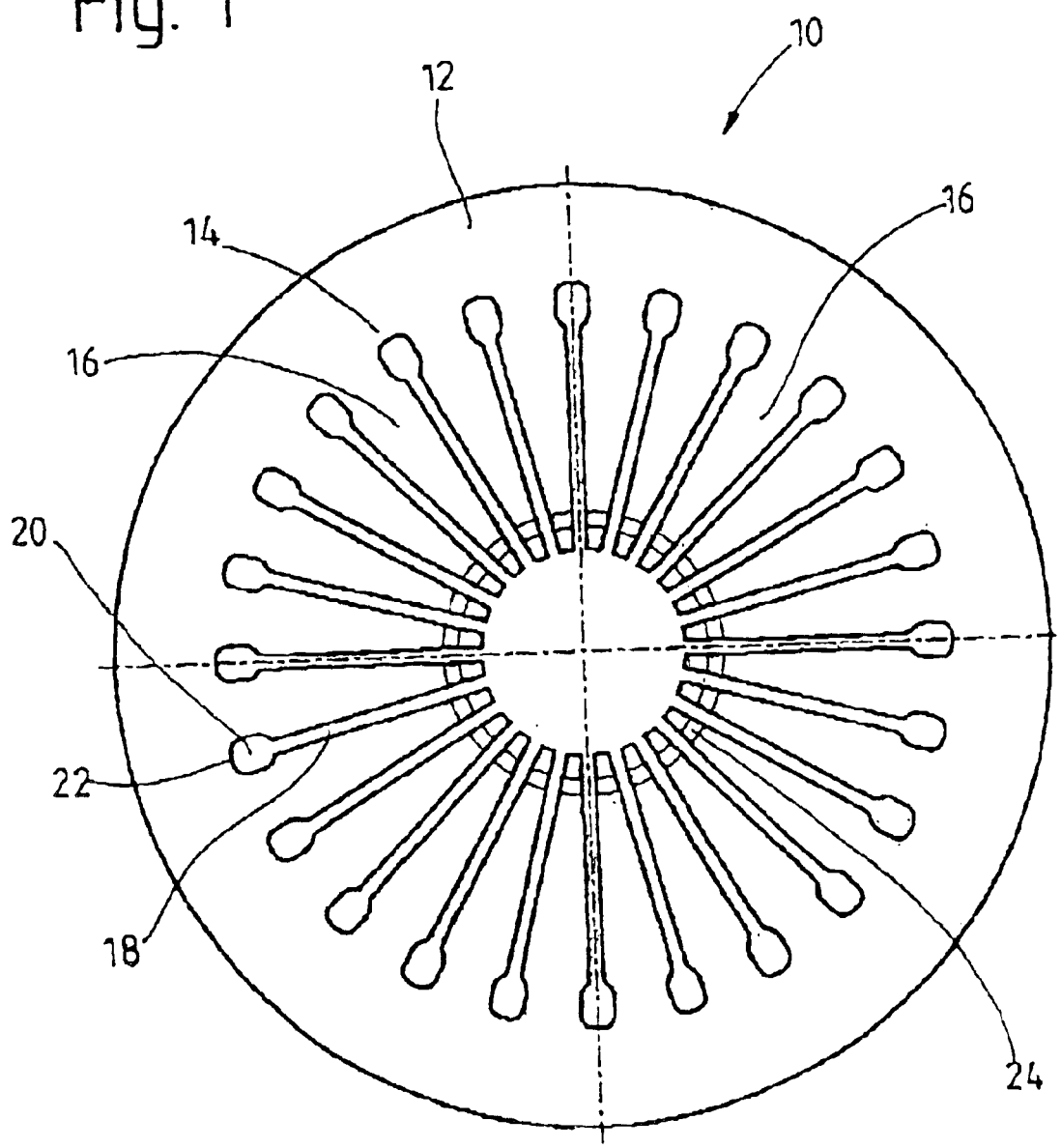
FIG. 1 is an axial view of a diaphragm spring.

FIG. 1 shows a force storage device in the form of a diaphragm spring 10 having a ring-like body area 12 radially on the outside, which is essentially continuous in the circumferential direction. Spring tongues 16 extend radially inward from this body area 12, i.e., from the radially inner area 14 of this body area. The spring tongues 16, which are arranged in a row in the circumferential direction, are separated from each other by openings 18. The openings 18 are open radially on the inside and have an expanded area 20 radially on the outside. In this radially outer area 20, which is expanded in the circumferential direction, the openings 18 are bounded radially toward the outside by a curved base area 22.

In a manner known to those skilled in the art, a clutch-release mechanism can act on the radially inner ends 24 of the spring tongues 16 in order to deform the diaphragm spring 10 in opposition to its own intrinsic pretension, and thus to release a friction clutch equipped with this diaphragm spring 10. In the case of a clutch of the push type, the diaphragm spring 10 can be supported in the area of the circumferential expansions 20 on a housing by, for example, spacer bolts or the like, and the area of the ring-like body 12 situated farther outward in the radial direction can then exert force on a pressure plate, possibly by way of a wear take-up device or the like. In the case of a clutch of the pull type, the radially outer area of the ring-like body area 12 is supported against the housing, whereas an area situated radially farther inward acts on the pressure plate.

Figure 2:
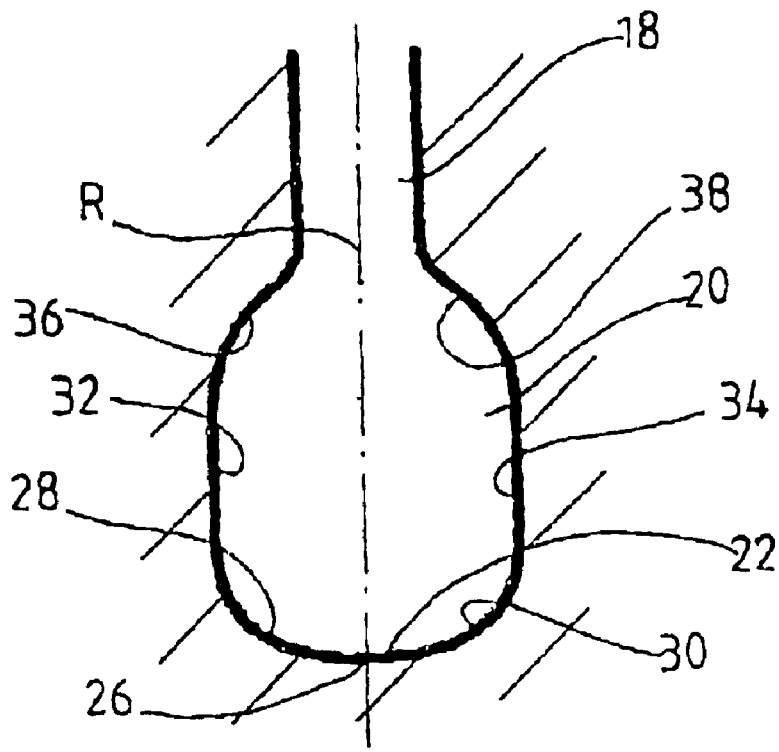
FIG. 2 is a view of an enlarged section of a diaphragm spring in the area of the radially outer end of an opening.

FIG. 2 shows the radially outer area of an opening 18 in greater detail. It can be seen that the openings 18 are designed with more-or-less bilateral symmetry in the circumferential direction with respect to a radial line R, which intersects the base area 22 at its circumferential center 26. Proceeding from this center 26, therefore, the wall areas 28, 30 forming the boundaries of each of the openings have the same shape. These wall areas 28, 30 are provided by the material forming the diaphragm spring 10, essentially spring steel material.

According to an essential principle of the present invention, the curvature of the wall areas 28, 30 increases with increasing distance from the center 26, that is, their radius of curvature decreases. The radius of curvature preferably reaches a maximum in the center area 26, which means that the minimum curvature is present here. In the direction proceeding radially inward, that is, in the direction away from the center area 26, the wall areas 28, 30 preferably have continuously increasing curvature until, upon reaching a minimum radius of curvature or a maximum degree of curvature, they pass over into approximately straight wall areas 32, 34, which are parallel to the radial line R. The expanded area 20 is essentially limited in the circumferential direction by these wall areas 32, 34. In this area, the spacer bolts or the like can pass through the diaphragm spring 10. Radially farther toward the inside, the opening 18 tapers back inward by means of wall areas 36, 38, for example, designed with a circular or curved shape, the precise curvature of which, however, is less critical from a stress standpoint.

Figure 3:
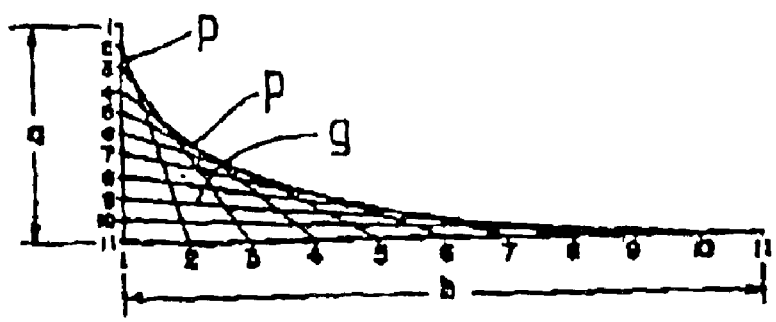
FIG. 3 is a diagram which illustrates the construction of a progression.

In the following, it is explained on the basis of FIG. 3 how the shape of the wall areas 28, 30, i.e., of the opening 18, can be arrived at in the radially outer area. The figure illustrates a simple graphic method according to Grodzinski for constructing an envelope for a stress-optimized component. The two axes a, b define a grid-like structure with scales of 1–11, but the ratio a/b of the graduations of these scales is in the range of 0.6–0.9. As a result, the distances between the individual points 1, 2, 3, ... on axis a and their associated points 1, 2, 3, ... on axis b are different from each other. One now connects the scale points on the two different axes a and b bearing the same designations by straight segments g, so that a grid-like structure is obtained. The upper edge of this grid structure is defined by a plurality of straight sections p of a polygon, which already indicate that an envelope made of these polygon sections p extending from scale point 11 on axis b to scale point 1 on axis a has a continuously increasing curvature, i.e., a continuously decreasing radius of curvature. The progression defined by the individual polygon sections p can be smoothed by mathematical methods, so that a curve-like course with continuously increasing curvature and a decreasing radius of curvature without discontinuities is obtained between point 11 on axis b and point 1 on axis a. Point 11 on axis b, for example, then corresponds to the center area 26 of the base 22, whereas point 1 on axis a, for example, corresponds to the transition from the curved wall areas 28, 30 to the approximately straight wall areas 32, 34.

In the previously described manner, a progression of this type can be used to define a geometry for the base 30 of the openings 18 by means of which it is possible to optimize the diaphragm spring with respect to stress in the radially inner area 14 of the body area 12. It should be pointed out that the design of the radially outer area of the openings 18 according to the invention can obviously be defined or calculated in some other way. When the method described above is used, the approximation to an inflection-free curve can be improved simply by specifying a larger number of scale points on the two axes a and b, which has the result that the individual polygon segments p become shorter.

It should be pointed out that areas with essentially constant curvature can be provided adjacent to the wall areas 28, 30 with increasing curvature. These areas of constant curvature can then continue either as areas 32, 34 of no curvature or continue immediately as the areas 36, 38, which start tapering again back toward the openings 18. Here it has been found, for example, that, with respect to machining, a significant improvement can be obtained simply by providing approximately half of the wall areas with the shape according to the invention starting from the center area 26 up as far as, for example, the areas 32, 34, which are straight, and then by providing the second half with a circular contour, that is, with an essentially constant curvature.

In another embodiment of the diaphragm spring according to the invention, the increasing curvature provided in the wall areas 28, 30 can also be achieved in that these wall areas or their curvatures are formed by a plurality of successive sections in the form of segments of a circle, each with an essentially constant curvature, where the curvature of the successive circular segments increases as they proceed away from the base area 22, i.e., away from the circumferential center area 26 of that base area. For example, two circular segment-like areas or sections of this type can be provided between the circumferential center area 26 and the junction with the essentially uncurved wall areas 32, 34. Several more such circular segment-like sections can obviously be provided to approximate a more-or-less continuous transition.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A diaphragm spring for a friction clutch, comprising:

a ring-like body area;

a plurality of spring tongues extending radially inward from said body area; and a plurality of openings formed between adjacent spring tongues, each opening having a curved base area with a circumferential center which is radially outermost in said opening, and a pair of walls extending radially inward from the center of said base area, at least one of said walls having a wall area with a curvature which increases with increasing distance from the center of said base area.

2. A diaphragm spring as in claim 1 wherein said curvature increases at least semi-continuously with increasing distance from the center of said base area.

3. A diaphragm spring as in claim 2 wherein said wall comprises successive areas which each have a constant curvature.

4. A diaphragm spring as in claim 1 wherein said center of said base area exhibits the minimum curvature.

5. A diaphragm spring as in claim 1 wherein said at least one wall further comprises one of a wall area having a constant curvature and a wall area having no curvature.

6. A diaphragm spring as in claim 1 wherein said at least one opening has bilateral symmetry with respect to a radius intersecting said base area.

7. A diaphragm spring as in claim 1 wherein all of said openings have essentially the same shape.

8. A diaphragm spring as in claim 1 wherein both of said walls have a wall area with a curvature which increases with increasing distance from the center of said base area.

9. A diaphragm spring as in claim 1 wherein said curvature increases continuously with increasing distance from the center of said base area.

10. A diaphragm spring for a friction clutch, comprising:

a ring-like body area;

a plurality of spring tongues extending radially inward from said body area; and a plurality of openings being formed between adjacent spring tongues, each opening having a curved base area with a circumferential center which is radially outermost in said opening, and a pair of walls extending radially inward from the center of said base area, said walls being symmetric with respect to a radius passing through the center of the base area, each wall having a wall area with a curvature which increases with increasing distance from the center of the base area.

* * * * *